UNITED STATES PATENT OFFICE.

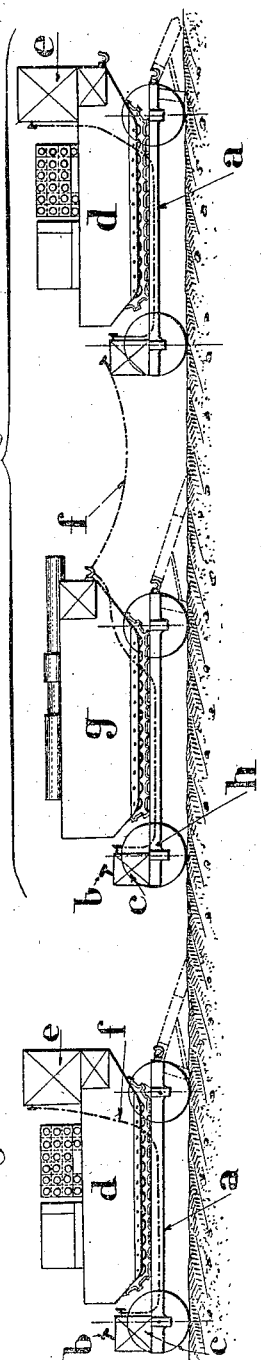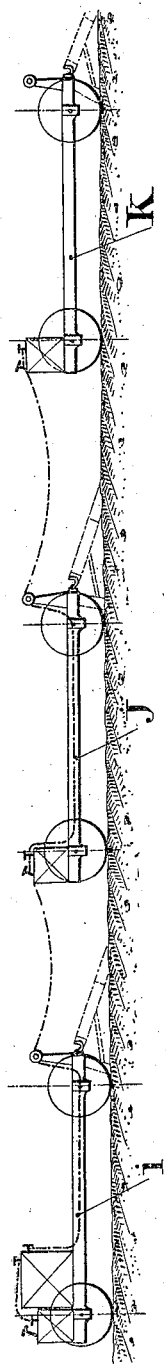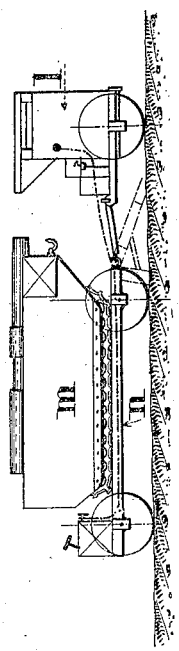

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

ROAD-TRAIN.

1,346,723.

Specification of Letters Patent.

Patented July 13, 1920.

Application filed July 27, 1917, Serial No. 183,202. Renewed November 21, 1919. Serial No. 339,679.

*To all whom it may concern:*

Be it known that I, EMILE RIMAILHO, a citizen of the French Republic, and residing in Paris, France, 98 Rue de la Victoire, consulting engineer, have invented certain new and useful Improvements in and Relating to Road-Trains, of which the following is a complete specification.

This invention relates to a road train formed by an automobile set comprising a transporting vehicle the load transported by which produces the energy necessary for the transporting vehicle.

The set comprises essentially two elements: one being the burden provided with a motor, a steam engine or internal combustion engine for instance, actuating a generating dynamo or a hydraulic generator; this burden may be a vehicle to be transported; the other being the vehicle that effects the transport, which is provided with one or more receiving motors capable of being supplied with energy (by means, for example of an electrical, hydraulic or mechanical connection) by the motor of its burden. This transport vehicle will be designated by the term of lorry.

This set may be applied to the transport of all burdens, especially of vehicles, and in particular of ammunition and ordnance vehicles in the form of caterpillars.

It is to be observed that the burden may consist of a complete caterpillar vehicle, or of load elements of heavy ordnance for instance, temporarily resting on caterpillars. In its application to ordnance the advantages of this device are made particularly obvious, by the conditions of mobility on very varied surfaces which are necessary for artillery vehicles. These vehicles ought to be able to move easily on roads to form a convoy, and they also ought to be able, over irregular or broken ground, to reach the firing position assigned to them, or approach the line of battle across fields.

These vehicles, which are often of considerable weight, ought therefore to be on wheels for forming a convoy on the road and on caterpillars for traveling across fields.

The invention realizes these conditions by electrical hydraulic or mechanical connection of the burden (the ordnance carrying vehicle for example) provided with an energy-generating motor set, with the receiving motor carried by the lorry.

In the accompanying drawing, which illustrates some constructional forms of the invention by way of example:—

Figure 1 illustrates a constructional form of an automobile set applied to a caterpillar ammunition wagon.

Fig. 2 shows an automobile set comprising an ammunition wagon actuating its transporting vehicle, but also actuating, by a cable, another set consisting of a lorry supporting a caterpillar gun carriage.

Fig. 3 shows a train of three transporting lorries united by a cable, each having its own electrical motor and the first carrying a dynamo.

In Fig. 4 is illustrated an automobile set comprising a lorry supporting a caterpillar gun carriage, the electric current which may be produced in the caterpillar gun carriage itself is engendered in an independent auxiliary trailer which may be coupled indifferently to the caterpillar gun carriage or to the lorry.

In Fig. 1, $a$ is the transporting vehicle or lorry which comprises its own steering gear $b$, as well as receiving motors or prime mover $c$, and of course it may if desired be provided with a generating motor. $d$ represents the load to be transported, which in the example illustrated consists of a caterpillar ammunition wagon comprising its generating motor $e$ which distributes its energy to the receiver $c$ of the lorry by means of the cable $f$. The energy will preferably be electric current, but it may be hydraulic, mechanical or thermal (steam or hydrocarbon).

In Fig. 2 the lorry $a$ carries as a load an ammunition wagon $d$ of which the generating motor $e$ supplies its current through the cable $f$ to the lorry $h$, which is provided with the usual steering gear $b$ and a motor $c$.

In Fig. 3 a train of lorries has been illustrated, showing the utilization of these vehicles for supply purposes when they have set down their caterpillar vehicles on the ground. In this figure, $i$ represents a gun-carrying lorry which may be provided with the generating motor $e$, $j$ a gun-carriage carrying vehicle, and $k$ the ammunition wagon-carrying vehicle.

Fig. 4 illustrates the combination of an energy-generating auxiliary trailer $l$, which may be coupled by cable either to the burden vehicle $m$ or directly to the lorry $n$. This construction is useful, because it gives the certainty of being able to actuate the lorry under all circumstances, in the event of the motor of the load to be transported becoming damaged.

What I claim is:—

1. In a road train a vehicle, a motor on said vehicle for the propulsion of the same, means for controlling the vehicle, a load carrier removable from the vehicle, and a generator on said load carrier for supplying energy to the motor on the vehicle.

2. In a road train a transporting vehicle, a motor thereon for the propulsion of the transporting vehicle, means for controlling the movement of the transporting vehicle, a vehicle on said transporting vehicle, a generator on said second mentioned vehicle for supplying energy to the motor on the transporting vehicle, and a motor for actuating said second vehicle coupled to the generator.

3. In a road train a vehicle having wheels, a caterpillar vehicle on said vehicle having wheels, a motor for the propulsion of said wheeled vehicle, a motor for the propulsion of the caterpillar vehicle, means for controlling the movement of the first named vehicle, and a generator on the caterpillar vehicle adapted to supply energy to the motor on the wheeled vehicle and to the motor on the caterpillar vehicle.

4. In a road train a transporting vehicle, a motor on said vehicle, a load for said transporting vehicle forming a vehicle of a different type, a motor on the vehicle forming the load, and a generator on said load-forming vehicle adapted to supply energy to either of the motors.

In testimony whereof I have hereunto set my hand at St.-Étienne, (France), this 20th day of June 1917.

EMILE RIMAILHO.

In the presence of two witnesses:
JEAN BRUYEROY,
DAVIS B. LEVIS.